(12) United States Patent
Mangum et al.

(10) Patent No.: US 6,673,179 B1
(45) Date of Patent: Jan. 6, 2004

(54) MULTI SCRIM NON-SLIP PAD AND METHOD OF MANUFACTURE

(75) Inventors: Scott Mangum, Alpharetta, GA (US); Kevin Donovan, Alpharetta, GA (US)

(73) Assignee: American Non-Slip Products, Inc., Alpharetta, GA (US)

(*) Notice: Subject to any disclaimer, the term of this patent is extended or adjusted under 35 U.S.C. 154(b) by 107 days.

(21) Appl. No.: 10/005,045

(22) Filed: Dec. 4, 2001

(51) Int. Cl.[7] .............................. B32B 3/10; B32B 5/18; B32B 27/30
(52) U.S. Cl. ............................ 156/79; 442/9; 442/22; 442/30; 442/32; 442/45; 442/55; 442/56; 428/308.4
(58) Field of Search ............................ 156/78–79, 324; 442/22, 30, 32, 9, 45, 55–56; 428/308.4

(56) References Cited

U.S. PATENT DOCUMENTS 4,594,284 A * 6/1986 Nakagawa et al. ......... 442/214

* cited by examiner

Primary Examiner—Sam Chuan Yao
(74) Attorney, Agent, or Firm—Stephen J. Stark; Miller & Martin LLP

(57) ABSTRACT

A multi scrim non-slip pad has a first scrim which is coated with a first polyvinyl chloride product to encapsulate the first scrim therein to form a first coated scrim. The first coated scrim may then be partially cured in some embodiments. A second scrim is coated to form a second coated scrim. The first and second scrims are applied together and then cured to form a multi scrim non-slip pad having at least a first foam layer adjacent and external to the first scrim, a second foam layer between the first and second scrim, and a third foam layer external and adjacent to the second scrim.

6 Claims, 5 Drawing Sheets

MULTI SCRIM NON-SLIP PAD AND METHOD OF MANUFACTURE

BACKGROUND OF THE INVENTION

1. Field of the Invention

The present invention relates a non-slip product and method of its manufacture and, more particularly, to a non-slip pad having multiple scrims each coated with liquid polyvinyl chloride (PVC) which are then baked in an oven to form foam coating layers around the scrims.

2. Description of Related Art

Several manufacturers, including the assignee of this application, make and sell a number of non-slip products including rug pads, work bench pads, tool box pads, kitchen drawer inserts, automobile cargo pads, and other products. These products provide a barrier between two surfaces which resist one surface moving, or slipping, relative to the other. An additional feature of most non-slip products is protection of at least one of the surfaces from scratching or denting. Some non-slip products also provide a cushioning effect, such as some rug pads, when weight is applied to the pad.

Non-slip products are typically manufactured utilizing a single knitted polyester scrim which may be purchased from manufacturers including Milliken, Supertex, and Cortina. The scrim is provided in rolls and is fed through a vat of liquid polyvinyl chloride which coats at least portions of the scrim. The coated scrim is then fed into an oven where it is baked as it passes through the oven. The coating forms a solid foam coating during the curing process in the oven. Once the product exits the oven, it is rolled or otherwise delivered for further processing including cutting to a desired size.

A variety of scrims and polyvinyl chloride products are available on the market. Some prior art scrims have relatively large apertures as shown in FIG. 1. These types of scrims are typically utilized so that when polyvinyl chloride (PVC) coating is applied, the PVC does not fill the apertures, but coats the threads and the kilots. U.S. Pat. No. 6,130,174 illustrates this effect in FIGS. 1 and 3. There are a number of advantages of this product configuration for some applications.

Another scrim type is shown in FIG. 2 which is very similar to FIG. 6 of U.S. Pat. No. 5,906,878. Some of the apertures in this scrim type contain thread members. The coated version of this scrim is illustrated in FIGS. 3 and 4 of the '878 Patent which provide alternating coated apertures. This product configuration has advantages for some applications as well.

A third scrim type is also utilized for some products wherein the majority, if not all, of the apertures contain thread members so that the majority, if not all, of the apertures are substantially completely coated during the coating process. The resulting coated scrim often forms a "sheet" or is substantially solid (i.e., few if any holes in the coated product or alternatively very small holes) and has a number of advantages for particular applications. FIG. 3 is a prior art scrim of this configuration. As one can see, the type of scrim utilized often effects the porosity, as well as amount of coating retained by the scrim.

The particular polyvinyl chloride (PVC) product utilized also affects the finished product. A number of manufacturers supply suitable PVC products. Some polyvinyl chloride products may be more, or less, viscous than others so that the thickness of the foam formed may be a function of the viscosity of the polyvinyl chloride product. Other characteristics of the particular polyvinyl chloride product utilized have also been found to effect the characteristics of the foam coating.

Finally, the temperature and time of exposure to temperature affects the finished pad product. Most ovens are believed to operate between about three hundred fifty and four hundred degrees Fahrenheit. The coated material is typically gripped by its edges and it is transported through the oven in a substantially horizontal manner. The speed of the coated material proceeding through the oven may be a function of the curing time needed to cure the liquid coating into a solid foam product about the polyester scrim.

While the scrim configuration, the chemical composition of the polyvinyl chloride product, and the time and temperature have been varied to achieve different non-slip products, a need still exists to provide a non-slip product which incorporates advantages of a number of non-slip products. Specifically, one client requested a non-slip product which would have a cushioning effect which is normally achieved with a sheet like coating made utilizing a scrim which is almost completely, if not completely coated. The client also wanted a textured top surface, such as one having a "raison" feel. Unsuccessful attempts were made utilizing various single scrim types and varying the amount and types of polyvinyl chloride coating placed on the single scrim as well as varying the time and temperature of the curing process in the oven.

These experiments produced a variety of results. As the amount of coating placed on the scrim increased, the scrim was placed under increased tension due to the weight of the coating as it was fed through the oven. Some scrims tore when overloaded. Varying the time in the oven and heat of the oven also had an undesirable effect in a number of attempts. Overcuring of coated products sometimes resulted in an undesirable "popcorn" effect where the "bubbles" within the foam burst. Accordingly, a need exists for providing another method of manufacturing with a resulting new non-slip product.

SUMMARY OF THE INVENTION

The present invention recognizes and addresses these needs and others.

Consequently, it is an object of the present invention to provide a non-slip pad which combines advantageous aspects of multiple non-slip products.

It is another object of the present invention to provide a non-slip pad and method of manufacture to provide a plurality of scrims located in a substantially parallel configuration, each of the scrims being coated with polyvinyl chloride foam.

It is another object of the present invention to provide a non-slip pad and method of manufacture which incorporates a plurality of coated scrims.

Accordingly, the present invention provides a multi-scrim non-slip pad and method of its manufacture. The non-slip pad is manufactured by coating a first scrim with a first coating of a first polyvinyl coating. The first coating may be partially cured at this time by processing in an oven. A second scrim is then coated with a second coating which may be of the first or of a second polyvinyl coating and the second coated scrim is applied to the first coated scrim. The multi-scrim product is then processed in the oven to cure the first and second coatings which also forms a "weld" which is where the two coatings join one another in a mechanical fashion.

Utilizing this method of manufacture, the first and the second scrim may have different configurations such as a first scrim which forms a substantially solid sheet when coated and a second scrim which retains a configuration of at least some apertures through the coated second scrim. This allows for combining advantages of both scrim configurations. If the second scrim is placed on top of the first scrim, the substantially solid bottom will be below the textured top. This has been found advantageous in the creation of yoga mats, as well as tool box pads for certain applications. Other applications may be found for the new pads as well. For this product configuration, the non-slip pad has good cushioning characteristics while providing the desired textured top surface. Other applications may be found for the new pads as well.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 4:
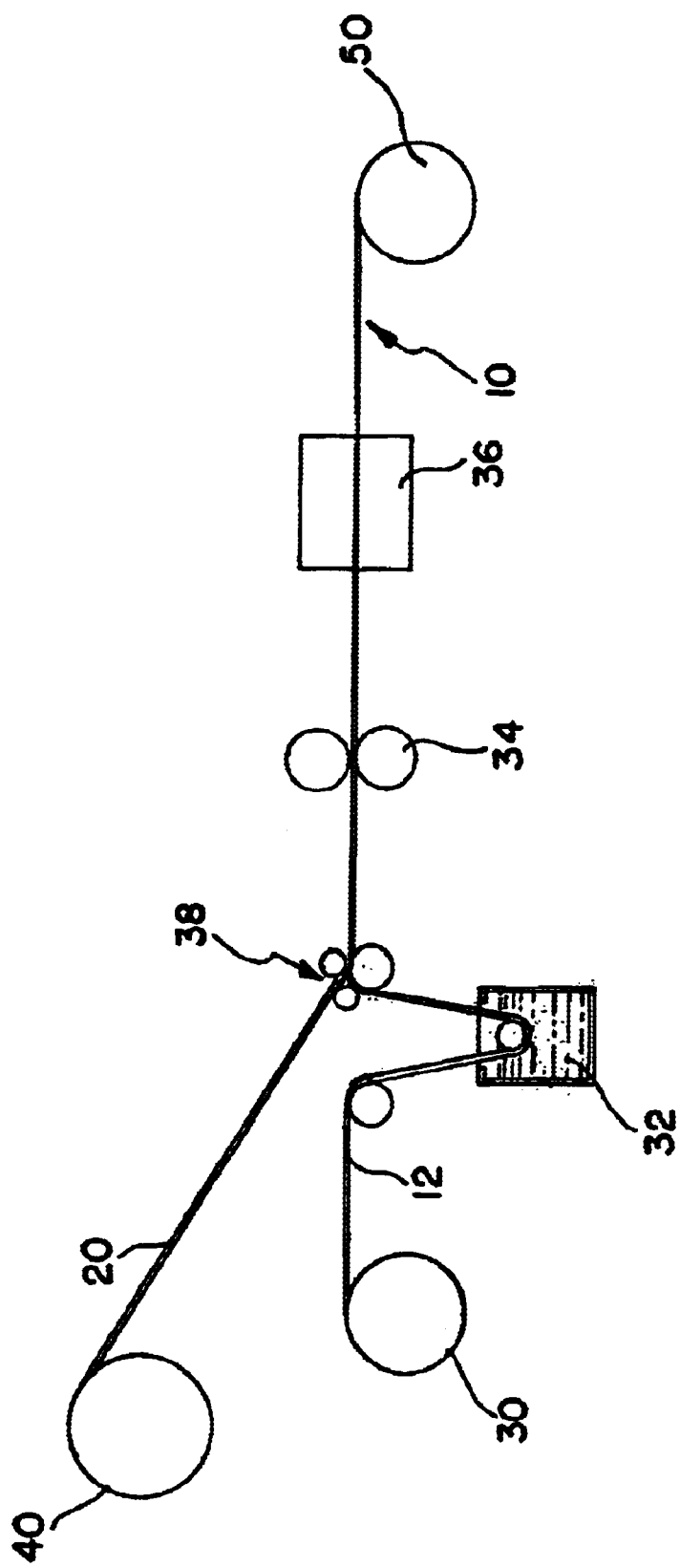
FIG. 4 is a schematic diagram of a method and apparatus for making a multi-scrim non-slip pad of the present invention.

The present invention is concerned with a multi-scrim non-skid pad 10 and the method of manufacturing the pad. Accordingly FIG. 4 is a schematic diagram showing the method of production of the non-skid pad 10 while FIGS. 5 and 6 show a non-skid pad 10 produced in accordance with the method described below.

Figure 1:
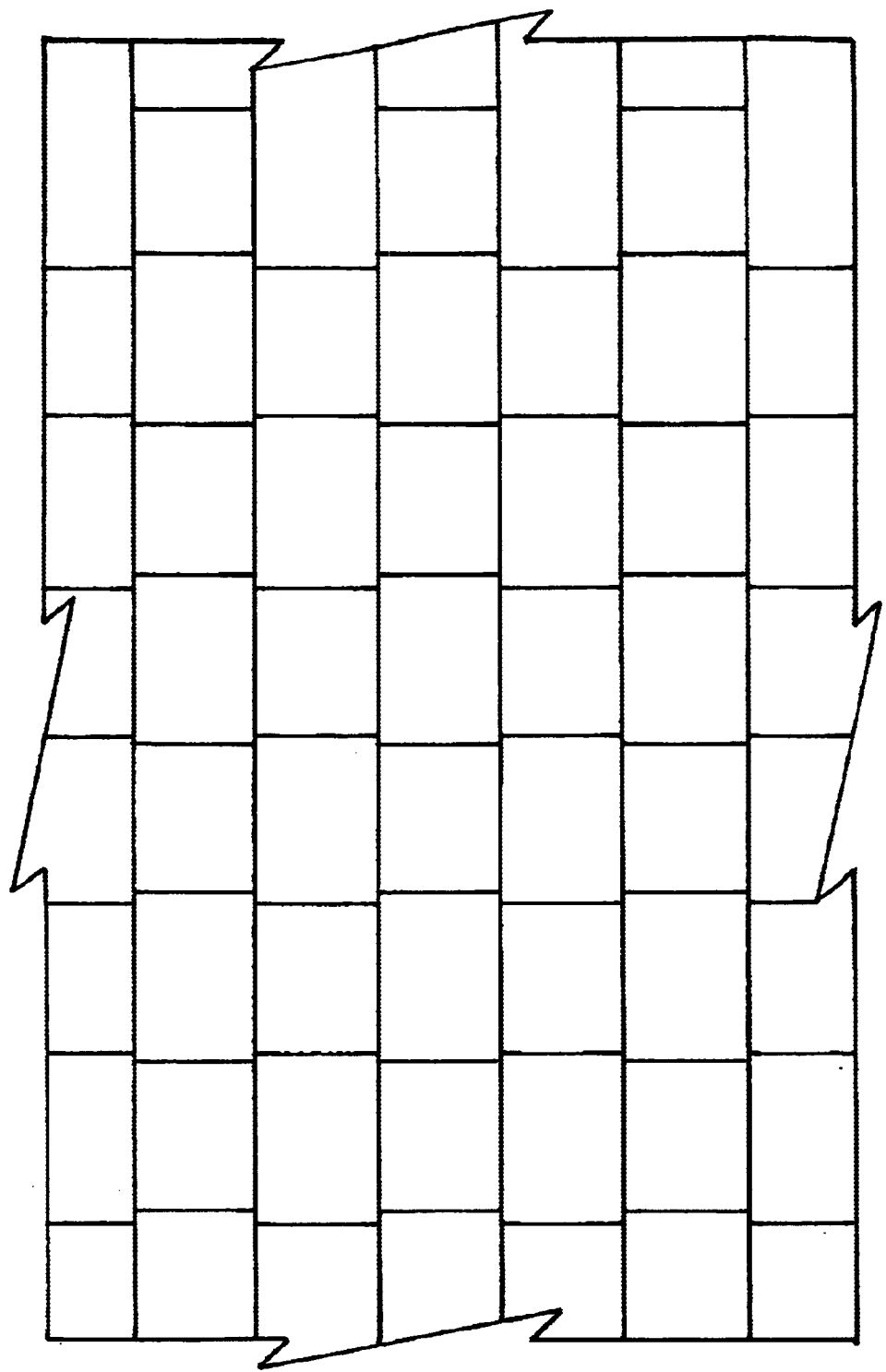
FIG. 1 is a prior art scrim of a first configuration.
Figure 2:
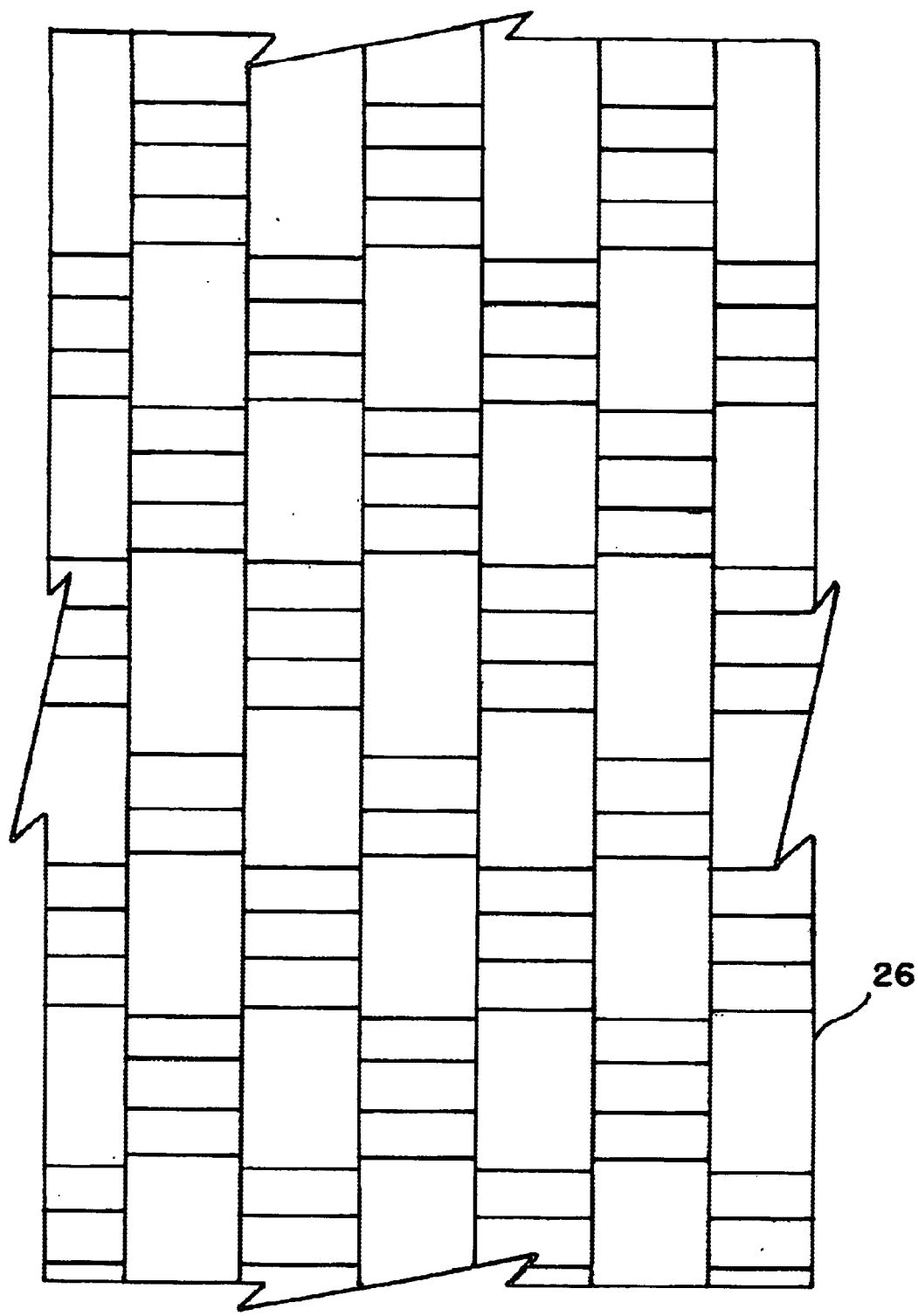
FIG. 2 is a prior art scrim of a second configuration.
Figure 3:
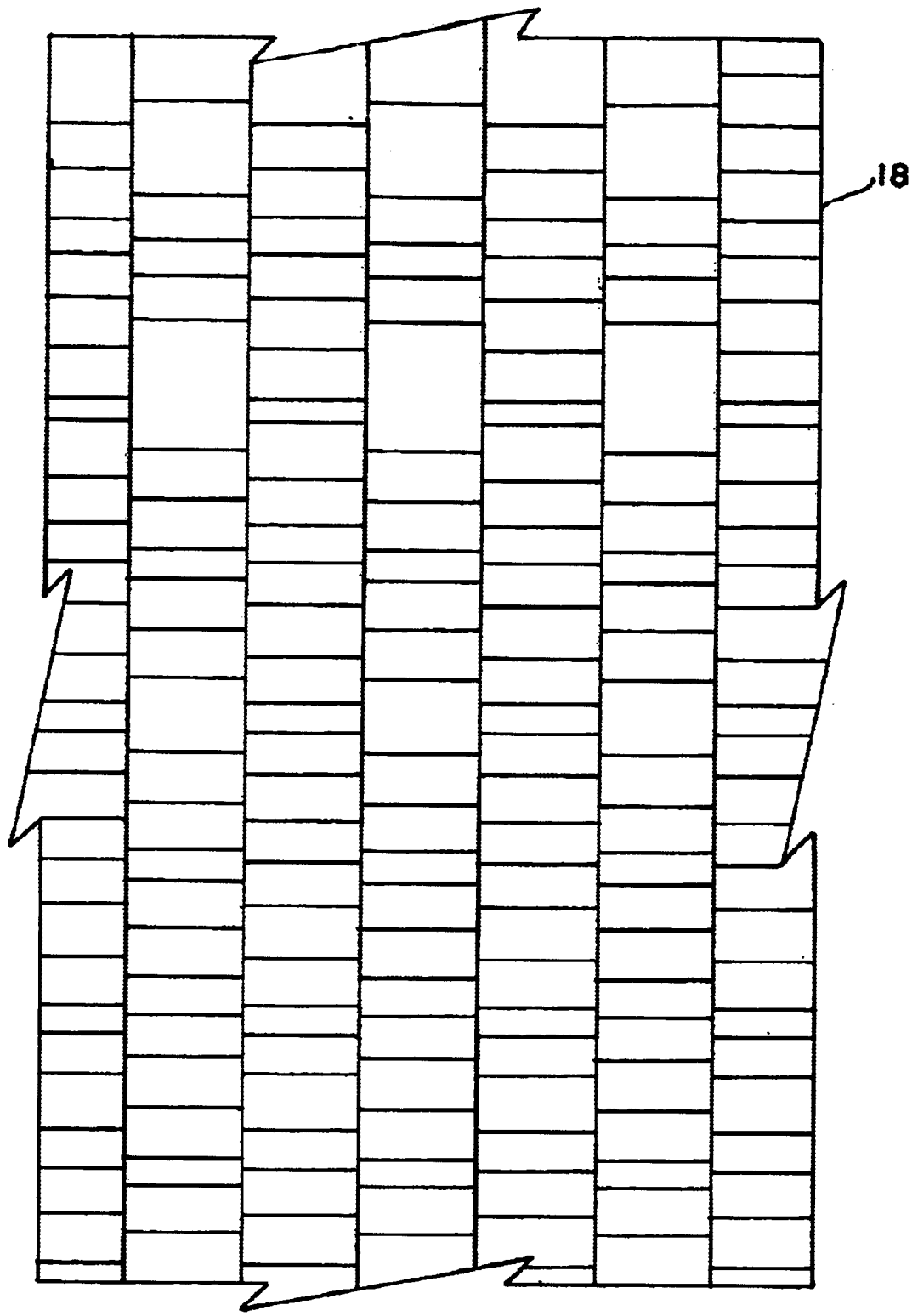
FIG. 3 prior art scrim of a third configuration.
Figure 6:
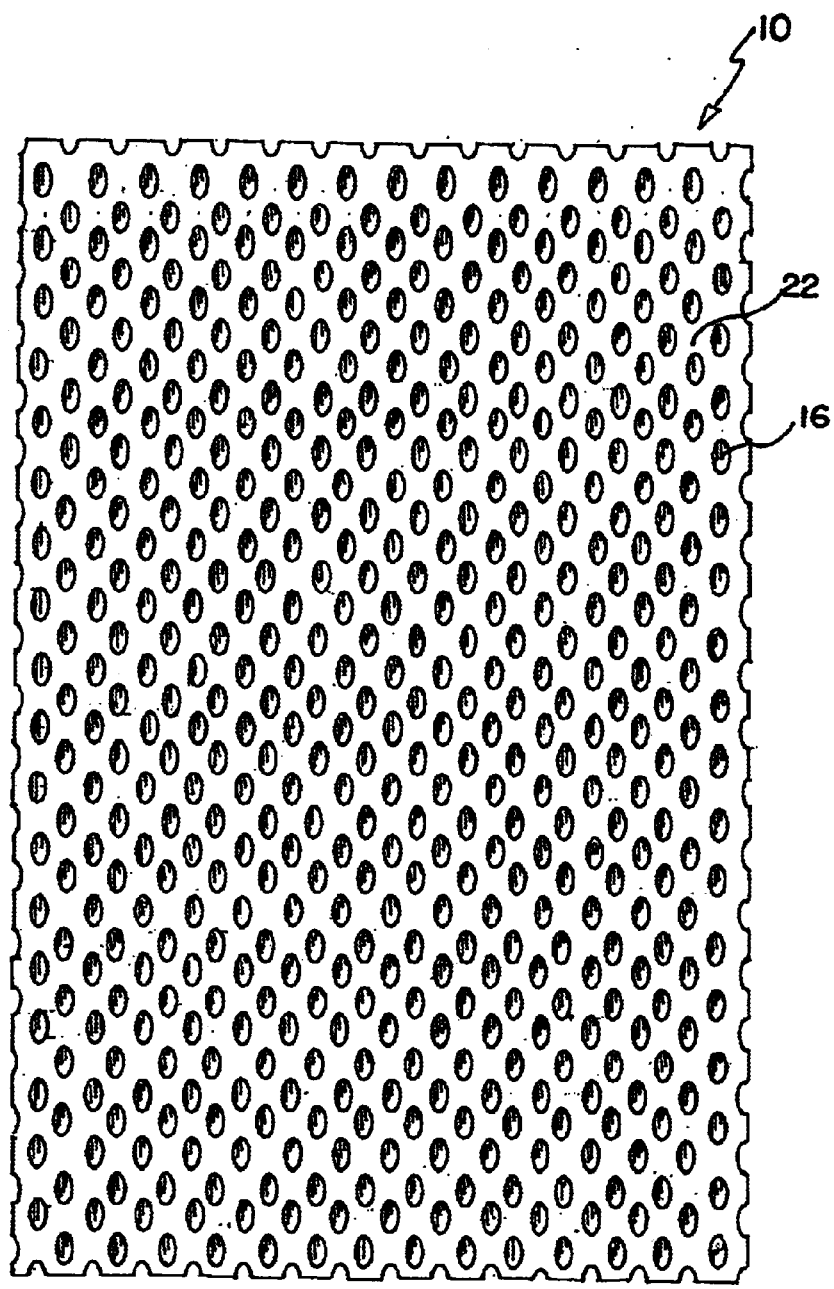
FIG. 6 is a top plan view of the pad of FIG. 5.
Figure 5:
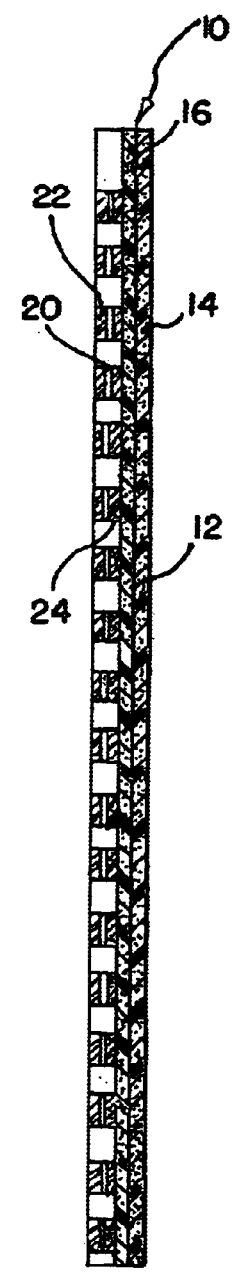
FIG. 5 is a cross section of a multi-scrim non-slip pad of the present invention.

Referring first to FIGS. 5 and 6, a first scrim 12 is located adjacent to and above a first polyvinyl foam coating 14. A second polyvinyl chloride foam layer 16 is located above and adjacent to the first scrim 12. The first scrim 12 in this embodiment is similar to the scrim 18 of FIG. 3 before it is coated with polyvinyl chloride (PVC) coating and cured to form a polyvinyl chloride foam. Of course other scrim configurations could be utilized for the first scrim 12 such as the scrims shown in FIGS. 1 and 2 or other scrim designs. The first scrim 12 is preferably a knitted polyester fabric.

FIG. 5 also shows a second scrim 20 between adjacent third polyvinyl chloride foam layer 22 and fourth polyvinyl chloride foam layer 24. The third foam layer 22 is above and adjacent to the second scrim 20, while the fourth foam layer 24 is below and adjacent to the second scrim 20. The second scrim 20 is similar to the prior art configuration 26 illustrated in FIG. 2. Of course, other scrim configurations could be utilized for the second scrim 20.

The second and fourth foam layers 16,24 are illustrated as being "welded", mechanically and/or chemically connected. This occurs through the application of the second scrim 20 to the first scrim 12 after the first scrim 12 has been coated or encapsulated with a polyvinyl coating on both sides. The first coated scrim 12 may be partially cured at this time, or not. The second scrim 20 may also be coated, or it may be coated during and/or after the application to the first coated scrim. The first and second scrims 12,20 are then applied to one another with at least one layer of polyvinyl chloride coating therebetween to form an intermediate foam layer upon curing.

The second and fourth foam layer 16,14 may be indistinguishable from one another if the second scrim 20 is applied directly to a coated first scrim in some embodiments, or they may be distinct as illustrated in FIG. 5. In fact, the polyvinyl chloride coating products utilized on the first and second scrims 12,20 may differ in color and/or other qualities for particular applications.

In the embodiment illustrated in FIGS. 5 and 6, the first scrim 12 is located between and adjacent to first and second foam layers 14 and 16. In fact, first and second foam layers 14,16 encapsulate the first scrim 12. The first scrim 12 illustrated substantially forms a non-porous sheet, or alternatively, has very small holes extending through the scrim, when coated with polyvinyl chloride liquid and the liquid coating is cured about the first scrim 12.

The second scrim 20 has alternating apertures in the illustrated embodiment. Accordingly, when coated, the coating is not retained in the larger apertures, but substantially coats the remaining portions of the second scrim 20. This design has been found to provide an advantageous texture on its top surface while providing good cushioning effects. Other advantages and configurations may be found through practice of the method described below. Other embodiments could utilize multiple layers of the same and/or different scrim types.

FIG. 4 is a schematic representation of a method the manufacture of the multi-scrim pad non-slip pad 10. The preferred process begins by obtaining a roll 30 of a first scrim 12. The roll 30 is fed through a coating bath 32 of a liquid first polyvinyl chloride product which coats the both top and bottom surfaces of the first scrim 12. Once the first scrim is coated it is typically gripped by its edges by wheels 34 and fed into oven 36 for curing.

In a first preferred method, as the coated first scrim 12 is fed out of the coating bath 32, the excess coating, along with a coating trough 38, coat the second scrim 20 as it is fed and applied to the first scrim 12 which has been coated. Accordingly there is at least one, if not two layers of coating between the first and second scrims 12,20 as they are fed through the wheels into the oven 36. Of course the coating trough 38 could contain a second polyvinyl chloride product which differs from the coating in the coating bath 32 which could affect the characteristics of the pad 10 after curing in the oven 36. In this embodiment, it may be that a single coating layer would exist between the first and second scrims 12,20.

In an alternatively preferred embodiment of the method of manufacture, the first scrim 12 after coating could be partially cured through the oven 36. After partial curing, it is placed at roll 40 and then referred to as the second scrim 20. Alternatively the second scrim 20 could be placed elsewhere downstream, but before the oven 36. A new first scrim 12 would then be coated and applied to the partially cured coated second scrim 20 as illustrated. The coating trough 38 could be utilized or omitted in this embodiment. The combination would then be fed through the oven and cured to form the foam layers adjacent to the scrims 12,20.

After curing, the multi-scrim pad 10 would have foam and scrim layers as described above in reference to FIGS. 5 and 6 and may be rolled on take up roll 50 or otherwise further processed. The multi-scrim pad 10 could be described as a laminated product having scrim and foam layers. The pad 10 is preferably comprised of substantially parallel and planar layers of foam and scrim. Other modifications could be made to the above method including providing other coating sources, as well as applying other substances in addition to the polyvinyl coatings.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A multi-scrim non-slip pad comprising:
   a first polyvinyl chloride foam coating layer;
   a first scrim adjacent and above the first polyvinyl chloride foam coating layer;
   a second scrim;
   a second polyvinyl chloride foam coating layer extending between the first scrim and the second scrim, said second polyvinyl chloride foam coating layer contacting the first and second scrims; and
   a third polyvinyl chloride foam coating layer adjacent and over the second scrim.

2. The multi-scrim non-slip pad of claim 1 wherein the first polyvinyl chloride foam coating layer and the second polyvinyl chloride foam coating layer encapsulate the first scrim.

3. The multi-scrim non-slip pad of claim 1 wherein the first and second scrims are substantially planar and parallel to one another.

4. A multi-scrim non-slip pad comprising:
   first polyvinyl chloride foam coating layer;
   a first scrim adjacent and above the first polyvinyl chloride foam coating layer;
   a second scrim;
   a second polyvinyl chloride foam coating layer between the first scrim and the second scrim;
   a third polyvinyl chloride foam coating layer adjacent and over the second scrim; and
   a fourth polyvinyl chloride foam coating layer adjacent and under the second scrim.

5. The multi-scrim non-slip pad of claim 4 wherein the fourth polyvinyl chloride foam coating layer is adjacent to the second polyvinyl chloride foam coating layer.

6. A multi-scrim non-slip pad comprising:
   a first polyvinyl chloride foam coating layer;
   a first scrim adjacent and above the first polyvinyl chloride foam coating layer;
   a second scrim;
   a second polyvinyl chloride foam coating layer between the first scrim and the second scrim, the first polyvinyl chloride foam coating layer and the second polyvinyl chloride foam coating layer encapsulating the first scrim; and
   a third polyvinyl chloride foam coating layer adjacent and over the second scrim,
   the third polyvinyl coating layer and a fourth polyvinyl chloride foam layer encapsulating the second scrim.

* * * * *